No. 720,188. PATENTED FEB. 10, 1903.
J. SEIDENER.
APPARATUS FOR MEASURING THE FLOW OF STEAM.
APPLICATION FILED APR. 1, 1901.
NO MODEL. 2 SHEETS—SHEET 1.

No. 720,188. PATENTED FEB. 10, 1903.
J. SEIDENER.
APPARATUS FOR MEASURING THE FLOW OF STEAM.
APPLICATION FILED APR. 1, 1901.

NO MODEL. 2 SHEETS—SHEET 2.

UNITED STATES PATENT OFFICE.

JOSEF SEIDENER, OF VIENNA, AUSTRIA-HUNGARY.

APPARATUS FOR MEASURING THE FLOW OF STEAM.

SPECIFICATION forming part of Letters Patent No. 720,188, dated February 10, 1903.

Application filed April 1, 1901. Serial No. 53,880. (No model.)

*To all whom it may concern:*

Be it known that I, JOSEF SEIDENER, a subject of the Emperor of Russia, residing at Vienna, in the Province of Lower Austria, in the Empire of Austria-Hungary, have invented certain new and useful Improvements in Apparatus for Measuring the Flow of Steam; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

This invention relates to an apparatus having for its object the measuring of the quantity of steam or gas flowing through the same in a unit of time. By means of this apparatus the weight of the steam or gas which flows through the same is determined in such a manner that on one side the pressure exerted by the flowing steam or gas upon a surface facing the flow is measured, and, on the other hand, the velocity of the circulation of the steam or gas is determined. The quotient of these two quantities will give a quantity proportional to the weight of the steam or gas which has flowed through the apparatus.

When flowing steam or gas strikes against a surface, the pressure exerted upon this surface will be expressed by the formula $C\gamma V^2$, V being the velocity, $\gamma$ the density of the steam or gas, and C a constant quantity depending from the given size, shape, and position of the surface. This formula can be decomposed into two factors, $C_1 \gamma V$ and $C_2 V$, of which the first represents a quantity proportional to the weight of the steam or gas flowing through the apparatus, while the second factor is a quantity proportional to the velocity of the circulation. The apparatus, which will be described in the following affords the possibility of determining both the expression $C\gamma V^2$ and the factor $C_2 V$, and therefore by dividing the former quantity with the latter the amount, by weight, of the steam or gas which has flowed through the apparatus can be distinctly calculated.

Figure 1:
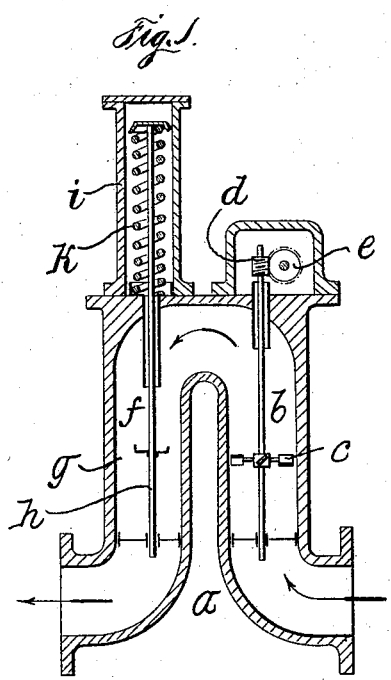
Figure 2:
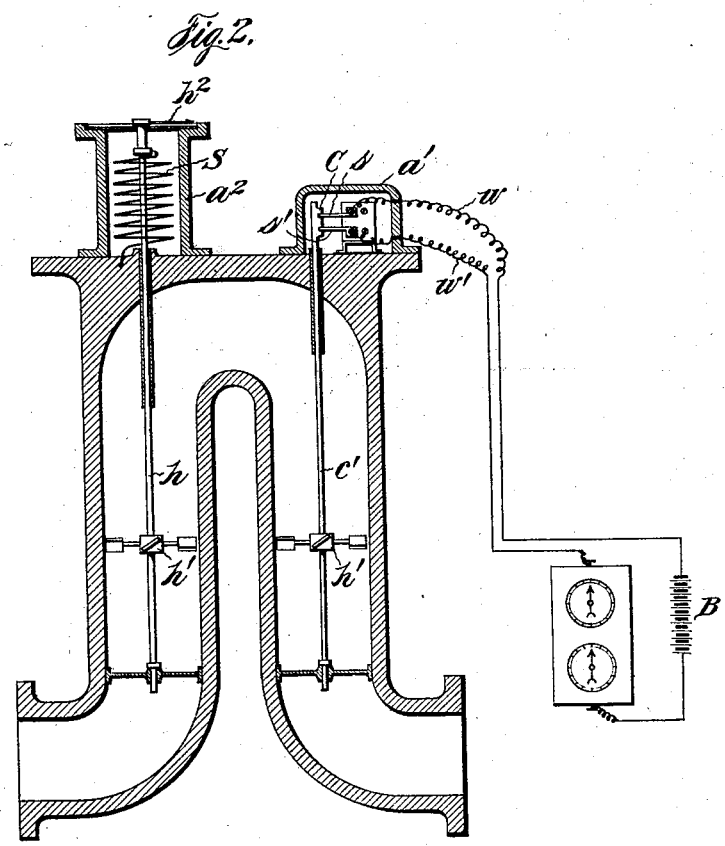

In the accompanying drawings I have illustrated apparatus constructed in accordance with my invention, Figure 1 showing said apparatus by a vertical sectional view, Fig. 2 being a similar view thereof, illustrating means for indicating the velocity of flow of fluids and a modified means for indicating the pressure of such fluids.

The apparatus consists, essentially, of a tube $a$, of the shape of an inverted U, which is inserted at a suitable place in the steam or gas conduit. In the branch $b$ of this tube is arranged a fly $c$, preferably of the construction shown in Fig. 2, against which strikes the steam or gas flowing in the direction of the arrow, whereby the fly is rotated. The number of revolutions of the fly is proportional to the velocity of the passage of the steam or gas. In order to facilitate the counting of the number of revolutions, the axis of the fly bears fixed upon the same a worm $d$, meshing with a worm-wheel $e$, which is arranged within a casing hermetically closed to the outward. The revolutions of this wheel can be inspected and counted from the outside through a glazed aperture in the casing. After having passed the branch $b$ of the tube $a$ the steam or gas the velocity of which is being determined in the manner above described is continuing its flow through the U-shaped tube $a$, and in the second branch $f$ of the said tube it bears against a plate $g$, fixed on a rod $h$. This rod reaches into a glass tube $i$, tightly closed to the outward and is connected with a spring $k$. The flow of the steam exerts a pressure upon plate $g$ and tends to pull the rod $h$ downward and to compress the spring $k$. The measure of the compression of the spring will be proportional to the quantity $\gamma V^2$.

The velocity of flow of the steam or gas through the apparatus, or, in other words, the revolutions of the fly $c$, may be registered, to which end its spindle $c'$ has secured thereto within the casing $a'$ a circuit-closer C, suitably insulated and revolving in the path of two contact-springs $s$ and $s'$, connected by wires $w$ $w'$ with the opposite poles of a battery B, in the circuit of which is included an electrically-operated registering mechanism of any well-known construction, so that at each revolution of the spindle $c'$ the circuit is closed and the revolution registered.

Instead of the pressure-indicating disk $g$ a fly-wheel $h'$ similar to wheel $c$ is secured to spindle $h$, and in this case said spindle projects through the cover of casing $a^2$ and carries a pointer $h^2$, traveling over a scale on said cover having pressure-indices, the spindle having secured thereto one end of a torsion-spring S, whose opposite end is secured to the said casing $a^2$ or to some fixed abutment therein. The impact of the steam or gas on fly $h'$ will cause the same to revolve on an angle proportionate to the power of impact or pressure of the steam or gas on said wheel, and this angle can be read on the scale and will be proportional to the quantity $\gamma V^2$. The quantity thus found is divided by the number of revolutions of the fly, whereby a quantity will be obtained which is proportional to the expression $\gamma V$ and which determines the amount of steam or gas flowing through the apparatus.

I claim—

1. Apparatus such as described, comprising a tube of the form of an inverted U, a wheel revoluble in one branch of said tube and means to determine the number of revolutions of the wheel; in combination with means in the other branch of said tube to determine the momentum of a fluid flowing therethrough, for the purpose set forth.

2. Apparatus such as described, comprising a tube of the form of an inverted U, a wheel revoluble in one branch of said tube and means to determine the number of revolutions of the wheel; in combination with spring-controlled means in the other branch of said tube to simultaneously determine the momentum of a fluid flowing therethrough, for the purpose set forth.

3. Apparatus such as described, comprising a tube of the form of an inverted U, means in one branch of said tube to determine the velocity of a fluid passing therethrough and a wheel in the other branch, a torsion-spring to control the angular movement of the wheel to simultaneously determine the momentum of said fluid, substantially as set forth.

In testimony that I claim the foregoing as my invention I have signed my name in presence of two subscribing witnesses.

JOSEF SEIDENER.

Witnesses:
JOSEF RUBRESCH,
ALVESTO S. HOGUE.